United States Patent
Ryoki et al.

(10) Patent No.: US 8,120,681 B2
(45) Date of Patent: Feb. 21, 2012

(54) IMAGE SENSING APPARATUS, IMAGE SENSING APPARATUS CONTROL METHOD, AND IMAGING SYSTEM

(75) Inventors: Tatsuya Ryoki, Chigasaki (JP); Toru Koizumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 438 days.

(21) Appl. No.: 12/363,919

(22) Filed: Feb. 2, 2009

(65) Prior Publication Data

US 2009/0207293 A1    Aug. 20, 2009

(30) Foreign Application Priority Data

Feb. 14, 2008   (JP) ................................. 2008-033624

(51) Int. Cl.
*H04N 3/14* (2006.01)
*H04N 5/335* (2011.01)
*H04N 9/64* (2006.01)

(52) U.S. Cl. .......................... 348/294; 348/245; 348/298

(58) Field of Classification Search .......... 348/241–255, 348/294–310; 250/208.1
See application file for complete search history.

(56) References Cited

U.S. PATENT DOCUMENTS

| | | | |
|---|---|---|---|
| 6,960,751 B2 | 11/2005 | Hiyama et al. | 250/208.1 |
| 7,321,110 B2 | 1/2008 | Okita et al. | 250/208.1 |
| 7,324,144 B1 | 1/2008 | Koizumi | 348/294 |
| 7,429,764 B2 | 9/2008 | Koizumi et al. | 257/292 |
| 7,466,003 B2 | 12/2008 | Ueno et al. | 257/462 |
| 7,538,810 B2 | 5/2009 | Koizumi et al. | 348/308 |
| 7,554,591 B2 | 6/2009 | Kikuchi et al. | 348/308 |
| 2005/0168618 A1 | 8/2005 | Okita et al. | 348/335 |
| 2006/0157759 A1 | 7/2006 | Okita et al. | 257/292 |
| 2007/0164332 A1 * | 7/2007 | Paik et al. | 257/292 |
| 2008/0036891 A1 | 2/2008 | Ono et al. | 348/308 |
| 2008/0062294 A1 | 3/2008 | Koizumi et al. | 348/300 |
| 2008/0062295 A1 | 3/2008 | Fujimura et al. | 348/301 |
| 2008/0062296 A1 | 3/2008 | Ogura et al. | 348/308 |
| 2009/0073298 A1 | 3/2009 | Ogura et al. | 348/308 |
| 2009/0159783 A1 | 6/2009 | Koizumi et al. | 250/208.1 |

FOREIGN PATENT DOCUMENTS

JP    60-183784         9/1985
JP    2005-217366 A    8/2005

* cited by examiner

*Primary Examiner* — Ricky Mack
*Assistant Examiner* — Brandi Thomas
(74) *Attorney, Agent, or Firm* — Fitzpatrick, Cella, Harper & Scinto (57) ABSTRACT

An image sensing apparatus includes a pixel array, a readout unit and an output unit having an output line group, a plurality of difference circuits, a first dummy line and a second dummy line. The output line group is interposed between the first dummy line and the second dummy line. The readout unit includes a plurality of memory circuits, each including a first holding capacitance and a second holding capacitance. A gain determined by a ratio of a capacitance value of the first holding capacitance and a capacitance value of a first output line is applied to the first signal output to the first output line, and a gain determined by a ratio of a capacitance value of the second holding capacitance and a capacitance value of a second output line is applied to the second signal output to the second output line.

8 Claims, 9 Drawing Sheets

IMAGE SENSING APPARATUS, IMAGE SENSING APPARATUS CONTROL METHOD, AND IMAGING SYSTEM

BACKGROUND OF THE INVENTION

1. Field of the Invention

The present invention relates to an image sensing apparatus, image sensing apparatus control method, and imaging system.

2. Description of the Related Art

An image sensing apparatus such as a MOS sensor includes a pixel array in which a plurality of pixels are arrayed, a readout unit which reads out a signal from a selected row (readout row) in the pixel array and outputs a plurality of signals, and an output unit which outputs an image signal in accordance with a plurality of signals output from the readout unit. The output unit performs correlated double sampling (to be simply referred to as CDS hereinafter) processing.

The readout unit reads out an optical signal and noise signal at different timings from a pixel on each column on a readout row in the pixel array, and temporarily holds the two signals in a line memory. The readout unit outputs the optical signal and noise signal held in the line memory to an optical signal output line (to be referred to as an S output line hereinafter) and noise signal output line (to be referred to as an N output line hereinafter) in the output unit. The readout unit sequentially performs this operation for respective columns.

In the output unit, a difference circuit arranged on the subsequent stage of the S and N output lines calculates the difference (performs CDS processing) between an optical signal transferred to the S output line and a noise signal transferred to the N output line. The difference circuit sequentially outputs the image signals of pixels on respective columns.

Assume that an optical signal and noise signal are output from a pixel on the first column to the first S output line and first N output line, respectively, and an optical signal and noise signal are output from a pixel on the second column to the second S output line and second N output line, respectively. In this case, the first difference circuit calculates the difference (performs CDS processing) between an optical signal output to the first S output line and a noise signal output to the first N output line, outputting the image signal of the pixel on the first column. The second difference circuit calculates the difference (performs CDS processing) between an optical signal output to the second S output line and a noise signal output to the second N output line, outputting the image signal of the pixel on the second column. This arrangement can increase the operation speed of the output unit because operations for an optical signal and noise signal can be parallelly executed for the first and second columns.

In this arrangement, the first S output line and first N output line correspond to pixels on the first column, and the second S output line and second N output line correspond to pixels on the second column. Thus, the first S output line, first N output line, second S output line, and second N output line are generally arranged in the order named.

The first S output line, first N output line, second S output line, and second N output line are generally juxtaposed to each other. However, it is known that adjacent output lines are capacitively coupled and cause crosstalk and decrease the signal-to-noise ratio. In contrast, in an image sensing apparatus disclosed in Japanese Patent Laid-Open No. 2005-217366, shielding lines and shielded pins are interposed between output lines in an arrangement in which the first S output line, first N output line, second S output line, and second N output line are arranged in the order named. According to Japanese Patent Laid-Open No. 2005-217366, capacitive coupling between output lines can be suppressed.

In a technique disclosed in Japanese Patent Laid-Open No. 60-183784, lines for transferring a signal are juxtaposed, and dummy lines are arranged on the two sides of the line group. According to this technique, any line is arranged between lines or between a line and a dummy line. This arrangement can remove variations of the line distributed capacitance, and increase the readout precision of a photoelectric conversion device.

Disturbance noise sometimes influences a solid-state image sensing apparatus. For example, if disturbance noise acts on an output line, the precision of a signal output from the solid-state image sensing apparatus may degrade. However, measures against disturbance noise have been examined in neither of Japanese Patent Laid-Open No. 2005-217366 nor 60-183784 examines.

SUMMARY OF THE INVENTION

It is an aim of the present invention to provide an image sensing apparatus, image sensing apparatus control method, and imaging system capable of obtaining a high-precision signal even if disturbance noise acts on an output line.

According to the first aspect of the present invention, there is provided an image sensing apparatus comprising: a pixel array in which a plurality of pixels are arrayed two-dimensionally; a selection unit which selects a readout row from which a signal is to be read out in the pixel array; a readout unit which reads out a signal from the readout row selected by the selection unit, and outputs a plurality of signals of each column on the readout row; and an output unit, wherein the output unit includes an output line group including a plurality of pairs, each of the pair including a first output line which transfers a first signal output from the readout unit and a second output line which transfers a second signal output from the readout unit, a plurality of difference circuits which are arranged in correspondence with the plurality of pairs, each of the plurality of difference circuits generating a difference signal between the first signal and the second signal in the corresponding pair, a first dummy line where an electric potential is set to a floating state during at least a period in which the readout unit outputs the first signal and the second signal, and a second dummy line where an electric potential is set to a floating state during at least a period in which the readout unit outputs the first signal and the second signal, and wherein the output line group is interposed between the first dummy line and the second dummy line, the readout unit includes a plurality of memory circuits which hold signals of a plurality of columns on the readout row, adjacent memory circuits among the plurality of memory circuits are connected to different pairs, each of the plurality of memory circuits includes a first holding capacitance which holds the first signal from the pixel, and a second holding capacitance which holds the second signal from the pixel, a gain determined by a ratio of a capacitance value of the first holding capacitance and a capacitance value of the first output line is applied to the first signal output to the first output line, and a gain determined by a ratio of a capacitance value of the second holding capacitance and a capacitance value of the second output line is applied to the second signal output to the second output line.

According to the second aspect of the present invention, there is provided a method of controlling an image sensing apparatus including a pixel array in which a plurality of pixels are arrayed, a readout unit which reads out a signal from the pixel array and outputs a plurality of signals, and an output unit, the output unit including an output line group including a plurality of pairs each of which includes a first output line for transferring a first signal output from the readout unit and a second output line for transferring a second signal output from the readout unit, a plurality of difference circuits each of which generates a difference signal between the first signal and the second signal corresponding to the pair of the first output line and the second output line, a first dummy line, and a second dummy line, the output line group being interposed between the first dummy line and the second dummy line, the method comprising: a first step of controlling each electric potential of the first dummy line and the second dummy line to a floating state during a period in which the readout unit outputs the first signal and the second signal; and a second step of resetting each electric potential of the first dummy line and the second dummy line to a reset electric potential after the plurality of difference circuits output the difference signals.

According to the third aspect of the present invention, there is provided an imaging system comprising the above-described image sensing apparatus, an optical system which forms an image on an image sensing plane of the image sensing apparatus, and a signal processing unit which processes a signal output from the image sensing apparatus to generate image data.

According to the present invention, even if disturbance noise acts on a plurality of output lines for parallelly transferring a plurality of signals from a plurality of pixels, a high-precision output signal can still be obtained.

Further features of the present invention will become apparent from the following description of exemplary embodiments with reference to the attached drawings.

DESCRIPTION OF THE EMBODIMENTS

Figure 1:
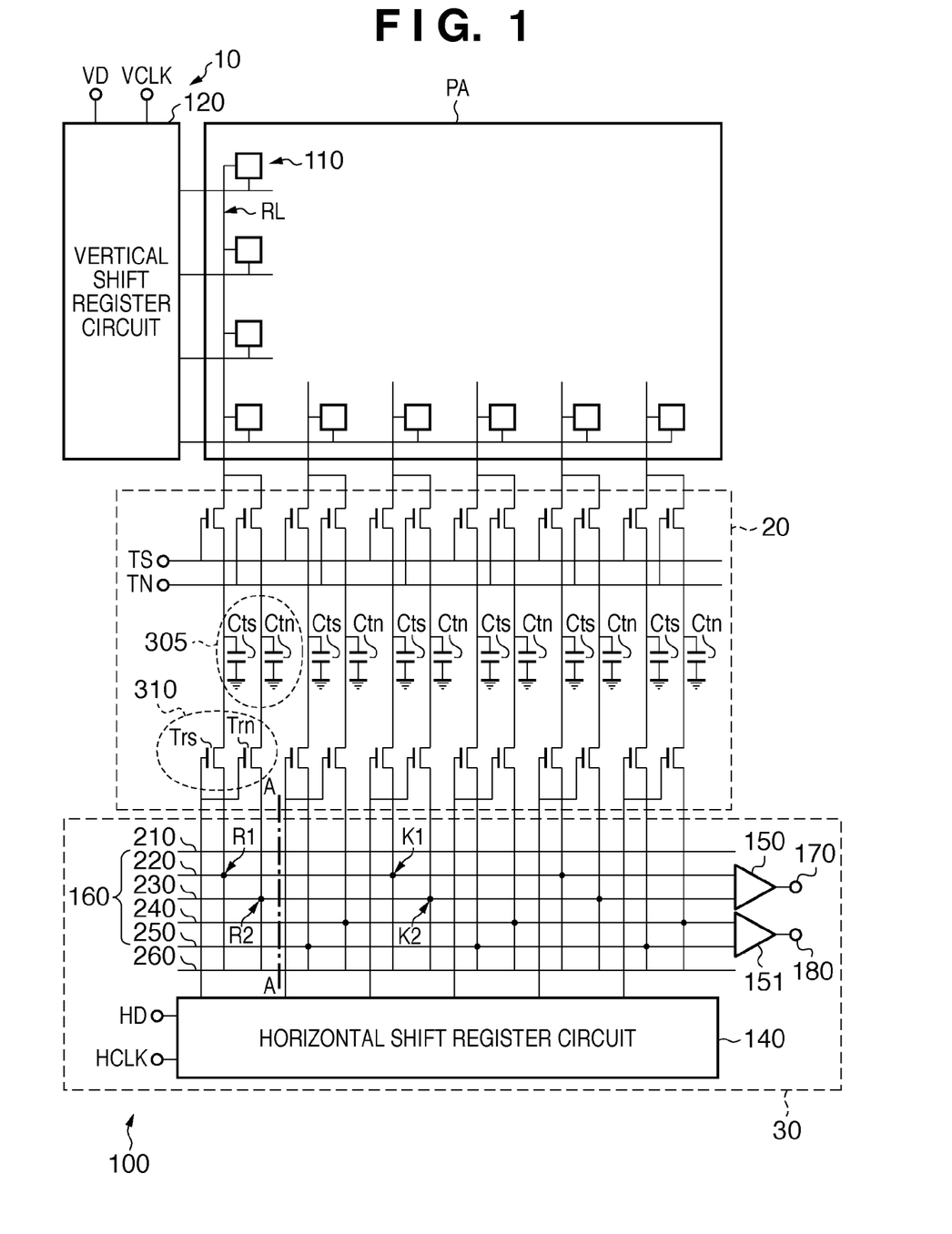
FIG. 1 is a circuit diagram of the arrangement of an image sensing apparatus 100 according to the first embodiment of the present invention.
Figure 2:
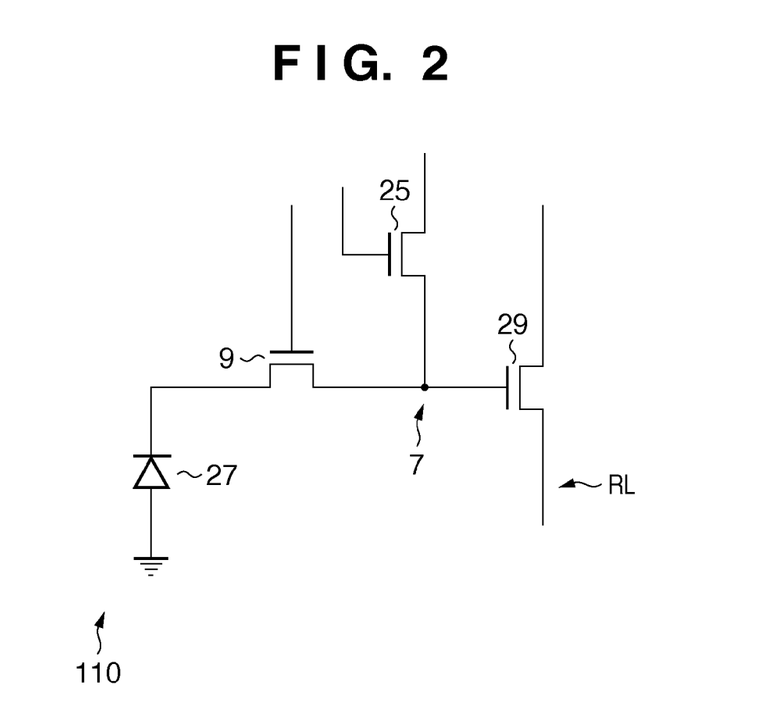
FIG. 2 is a circuit diagram of the arrangement of a pixel.

An image sensing apparatus 100 according to the first embodiment of the present invention will be explained with reference to FIGS. 1 and 2. FIG. 1 is a circuit diagram of the arrangement of the image sensing apparatus 100 according to the first embodiment of the present invention. FIG. 2 is a circuit diagram of the arrangement of a pixel.

As shown in FIG. 1, the image sensing apparatus 100 includes a pixel array PA, selection unit 10, readout unit 20, and output unit 30.

In the pixel array PA, a plurality of pixels 110 are arrayed two-dimensionally. As shown in FIG. 2, each pixel 110 includes a reset transistor 25, photoelectric conversion unit 27, transfer gate 9, floating diffusion (to be referred to as an FD hereinafter) 7, and amplification transistor 29. The reset transistor 25 resets the FD 7. The photoelectric conversion unit 27 generates charges corresponding to incident light by photoelectric conversion, and accumulates them. The photoelectric conversion unit 27 is, for example, a photodiode. The transfer gate 9 transfers charges accumulated in the photoelectric conversion unit 27 to the FD 7. The FD 7 converts charges into a voltage signal. The amplification transistor 29 amplifies a signal input from the FD 7, and outputs the amplified signal to a column signal line RL. In this manner, a signal is read out from a pixel 110.

In the following description, the columns of the pixel array PA are counted from left to right in the drawing, and the rows of the pixel array PA are counted from top to bottom in the drawing. In the pixel array PA, a plurality of pixels 110 may also be arrayed one-dimensionally. In this case, an image sensing apparatus 100 may be, e.g., a line sensor.

The selection unit 10 selects the region (readout row) of pixels from which signals are to be read out in the pixel array PA. The selection unit 10 includes a vertical shift register circuit 120. The vertical shift register circuit 120 sequentially selects the rows of the pixels 110 from the pixel array PA by a shift operation corresponding to, for example, timing signals VD and VCLK.

The readout unit 20 reads out signals from pixels in the region (readout row) selected from the pixel array PA by the selection unit 10. The readout unit 20 outputs a plurality of signals from respective columns on the readout row. The readout unit 20 includes memory circuits 305 and transfer circuits 310.

Each memory circuit 305 holds signals from respective column on the readout row in the pixel array PA. The memory circuit 305 includes an optical signal holding capacitance (first holding capacitance) Cts and a noise signal holding capacitance (second holding capacitance) Ctn. The optical signal holding capacitance Cts holds an optical signal (first signal) read out from the pixel 110 on each column on the selected readout row. The noise signal holding capacitance Ctn holds a noise signal (second signal) read out from the pixel 110 on each column on the selected readout row. The optical signal is obtained by superposing a noise signal on an image signal. The image signal is a signal accumulated in the photoelectric conversion unit 27. The noise signal is a signal corresponding to fixed pattern noise such as the offset of a transistor in the pixel 110. Both the optical signal holding capacitance Cts and noise signal holding capacitance Ctn have a capacitance value Ct.

Each transfer circuit 310 transfers a signal held in the memory circuit 305 to an output line group 160 in turn. Each transfer circuit 310 includes a signal transfer transistor Trs and noise transfer transistor Trn for each column of the pixel array PA in correspondence with the optical signal holding capacitance Cts and noise signal holding capacitance Ctn.

Figure 4:
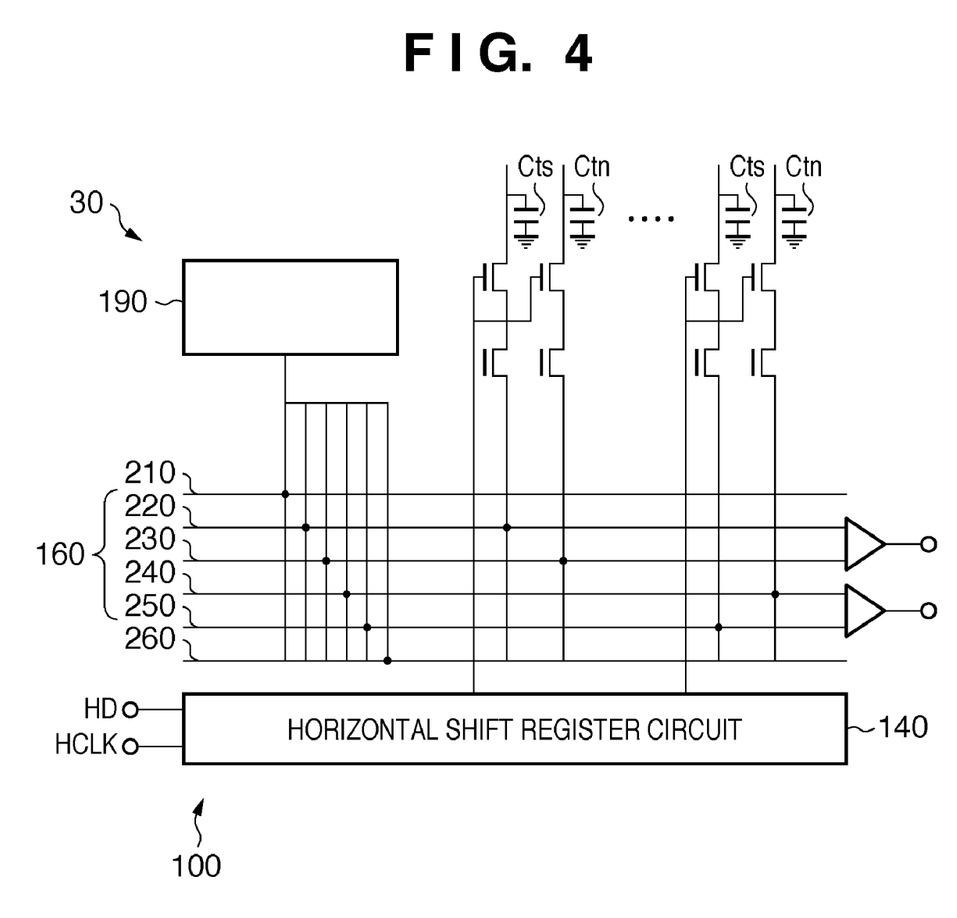
FIG. 4 is a diagram of the arrangement of a control unit 190, an output line group 160, a first dummy line 210, and a second dummy line 260 according to the first embodiment of the present invention.

The output unit 30 includes a horizontal shift register circuit 140, the output line group 160, a first dummy line 210, a second dummy line 260, a plurality of difference circuits 150 and 151, and a control unit 190 (see FIG. 4).

The horizontal shift register circuit 140 controls every two transfer circuits 310 to sequentially transfer the signals of every two columns held in every two memory circuits 305 to the output line group 160 in accordance with timing signals HD and HCLK. For example, the horizontal shift register circuit 140 transfers, to the output line group 160, the optical signals and noise signals of pixels on the first and second columns that are held in the memory circuits 305. Then, the horizontal shift register circuit 140 transfers, to the output line group 160, the optical signals and noise signals of pixels on the third and fourth columns.

The output line group 160 receives signals held in the memory circuits 305. That is, the output line group 160 sequentially receives optical signals and noise signals for two columns from the pixels on a readout row selected by the selection unit 10.

The output line group 160 includes a plurality of pairs, and each of the pair includes a first output line and a second output line. More specifically, the output line group 160 includes K (K is a natural number of 2 or more) pairs of first output lines and second output lines. In the following description, the case where K=2 is exemplified. As shown in FIG. 1, the output line group 160 includes a first S output line (first output line) 220, first N output line (second output line) 230, second S output line (first output line) 250, and second N output line (second output line) 240. The first S output line 220 and first N output line 230 are paired, whereas the second S output line 250 and second N output line 240 are paired.

The first S output line 220 receives an optical signal from the first pixel (e.g., a pixel on the first column on a readout row selected by the selection unit 10) in the pixel array PA. The first S output line 220 transfers the optical signal of the first pixel output from the readout unit 20.

The first N output line 230 is juxtaposed to the first S output line 220. The first N output line 230 receives a noise signal from the first pixel in the pixel array PA. The first N output line 230 transfers the noise signal of the first pixel output from the readout unit 20.

The second N output line 240 is juxtaposed to the first N output line 230. The second N output line 240 receives a noise signal from the second pixel (e.g., a pixel on the second column on a readout row selected by the selection unit 10) in the pixel array PA. The second N output line 240 transfers the noise signal of the second pixel output from the readout unit 20.

The second S output line 250 is juxtaposed to the second N output line 240. The second S output line 250 receives an optical signal from the second pixel in the pixel array PA. The second S output line 250 transfers the optical signal of the second pixel output from the readout unit 20.

The readout unit 20 includes a plurality of memory circuits which hold signals from a plurality of columns on a readout row. Adjacent memory circuits among a plurality of memory circuits are connected to different pairs in the output line group 160. Each of the memory circuits includes the optical signal holding capacitance (first holding capacitance) Cts which holds an optical signal (first signal) from a pixel, and the noise signal holding capacitance (second holding capacitance) Ctn which holds a noise signal (second signal) from a pixel. Readout operation from a memory circuit for each column to an output line is done by distributing charges held in the holding capacitance Ct (Cts or Ctn) of the memory circuit to a capacitance Ch of the output line. Hence, the gain is $Ct/(Ct+Ch)$.

That is, the signal transfer transistor (first transistor) Trs connects/disconnects the optical signal holding capacitance (first holding capacitance) Cts and the first S output line 220 (or the second S output line 250). When the signal transfer transistor (first transistor) Trs is turned on, a gain determined by a capacitive division ratio according to the ratio of the capacitance value of the holding capacitance to the capacitance value of the output line is applied to an optical signal output from the readout unit 20 to the first S output line 220.

The noise transfer transistor (second transistor) Trn connects/disconnects the noise signal holding capacitance (second holding capacitance) Ctn and the first N output line 230 (or the second N output line 240). When the noise transfer transistor (second transistor) Trn is turned on, a gain determined by the capacitive division ratio is applied to a noise signal output from the readout unit 20 to the first N output line 230.

The optical signal output line is represented as an S output line, and the noise signal output line is represented as an N output line.

The first dummy line 210 is arranged adjacent to the first S output line 220 on a side opposite to the first N output line 230. The first dummy line 210 elongates to the first difference circuit 150. The first dummy line 210 is set to the floating state during at least a period in which the readout unit 20 outputs the first and second signals. Preferably, the first dummy line 210 is set to the floating state in synchronism with the timing when the readout unit 20 outputs the first and second signals to the first S output line 220 and first N output line 230, respectively.

The second dummy line 260 is arranged adjacent to the second S output line 250 on a side opposite to the second N output line 240. The second dummy line 260 elongates to the second difference circuit 151. The second dummy line 260 is set to the floating state during at least a period in which the readout unit 20 outputs the first and second signals. Preferably, the second dummy line 260 is set to the floating state in synchronism with the timing when the readout unit 20 outputs the first and second signals to the second S output line 250 and second N output line 240, respectively.

The output line group 160 is interposed between the first dummy line 210 and the second dummy line 260.

As shown in FIG. 4, the control unit 190 controls the first and second dummy lines 210 and 260 to the floating state during the period in which the readout unit 20 outputs an optical signal and noise signal, as shown in FIG. 4. After a plurality of difference circuits output image signals, the control unit 190 resets the electric potentials of the first and second dummy lines 210 and 260 to a reset electric potential. The reset electric potential is generally set within the input range of the difference circuit. Preferably, the control unit 190 resets the electric potentials of the first and second dummy lines 210 and 260 to the reset electric potential in synchronism with the timing when a plurality of difference circuits completely output image signals.

The control unit 190 may also reset the electric potentials of all the output lines 220, 230, 240, and 250 of the output line group 160 to the reset electric potential after a plurality of difference circuits output image signals.

A plurality of difference circuits includes K (which is 2, in this case) difference circuits corresponding to the number of pairs K of output lines in the output line group 160. A plurality of difference circuits is arranged in correspondence with the respective pairs of output lines in the output line group 160. Each of the difference circuits generates the difference signal between the first and second signals in a corresponding pair.

A plurality of difference circuits include the first and second difference circuits 150 and 151.

The first difference circuit 150 calculates the difference between a signal output to the first S output line 220 and a signal output to the first N output line 230. The first difference circuit 150 amplifies the difference signal between an optical signal from the first S output line 220 and a noise signal from the first N output line 230, and outputs the first image signal from an output terminal 170 to the subsequent stage.

The second difference circuit 151 calculates the difference between a signal output to the second N output line 240 and a signal output to the second S output line 250. The second difference circuit 151 amplifies the difference signal between a noise signal from the second N output line 240 and an optical signal from the second S output line 250, and outputs the second image signal from an output terminal 180 to the subsequent stage.

Figure 3:
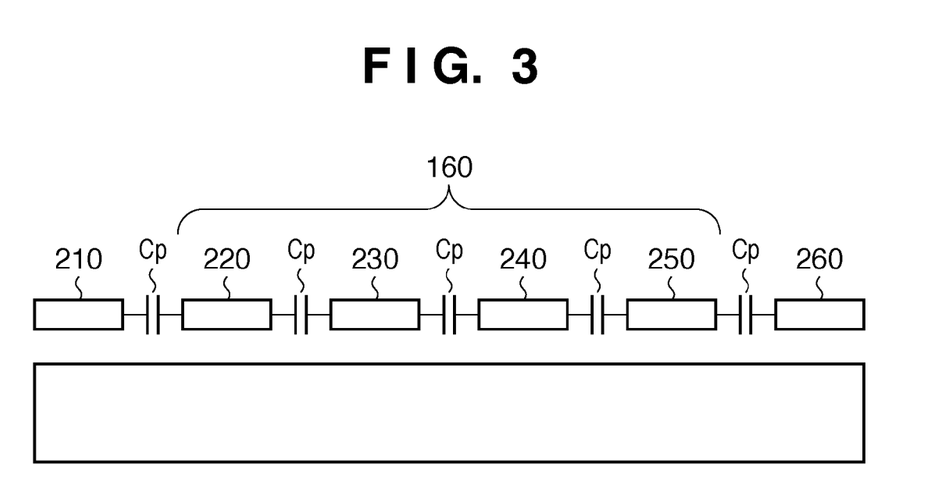
FIG. 3 is a sectional view of a structure corresponding to the arrangement of FIG. 1 taken along the line A-A.

Capacitive coupling between output lines in the output line group will be explained with reference to FIG. 3. FIG. 3 is a sectional view of a structure corresponding to the arrangement of FIG. 1 taken along the line A-A.

As shown in FIG. 3, the output line group 160 is interposed between the first dummy line 210 and the second dummy line 260. The first dummy line 210, first S output line 220, first N output line 230, second N output line 240, second S output line 250, and second dummy line 260 are arranged at almost equal intervals. The thicknesses, lengths, and materials of the first dummy line 210, first S output line 220, first N output line 230, second N output line 240, second S output line 250, and second dummy line 260 are almost the same. In the arrangement of the first dummy line 210, first S output line 220, first N output line 230, second N output line 240, second S output line 250, and second dummy line 260, the coupling capacitances between output lines and between output and dummy lines become Cp. Hence, the coupling capacitances of all the output lines, that is, the first S output line 220, first N output line 230, second N output line 240, and second S output line 250 in the output line group 160 become 2Cp.

Assume that the electric potentials of the first and second dummy lines 210 and 260 are controlled to a fixed electric potential (power supply electric potential). In this case, even if the same disturbance noise acts on the first dummy line 210, first S output line 220, first N output line 230, and second N output line 240, the electric potential of the first dummy line 210 hardly changes, but those of the first S output line 220, first N output line 230, and second N output line 240 change equally in accordance with the disturbance noise. Thus, the influence of the disturbance noise on a signal transferred to the first N output line 230 between two lines (the first S output line 220 and the second N output line 240) where electric potentials change equally in accordance with the disturbance noise, is different from the influence of the disturbance noise on a signal transferred to the first S output line 220 between a line (the first N output line 230) where an electric potential changes equally to the first S output line 220 and second N output line 240, and a dummy line (the first dummy line 210) where an electric potential hardly changes.

In contrast, according to the first embodiment, the first and second dummy lines 210 and 260 are set to the floating state during at least a period in which the readout unit 20 outputs the first and second signals. In this case, when the same disturbance noise acts on the first dummy line 210, first S output line 220, first N output line 230, and second N output line 240, the electric potentials of the first dummy line 210, first S output line 220, first N output line 230, and second N output line 240 change almost equally in accordance with the disturbance noise. Accordingly, the influence of the disturbance noise on a signal output to the first S output line 220 and the influence of the disturbance noise on a signal output to the first N output line 230 become almost equal to each other.

As described above, the output line group 160 is interposed between the first dummy line 210 and the second dummy line 260, and the first and second dummy lines 210 and 260 are set to the floating state. This can reduce an error caused by the influence of a disturbance noise.

To clarify the effects of the present invention, a signal having undergone CDS processing will be explained.

The possibility of fixed pattern noise left in a signal having undergone CDS processing will be described.

As shown in FIG. 1, a signal is output from a line memory for each column to an output line by distributing a signal held as the capacitance value Ct of the holding capacitance of the line memory to the capacitance value Ch of the output line. Thus, the gain is $Ct/(Ct+Ch)$, wherein Ch includes the coupling capacitance between adjacent dummy and output lines or the coupling capacitance between adjacent output lines. That is, an optical signal is output from the readout unit to the S output line in accordance with a gain determined by the capacitive division ratio. A noise signal is output from the readout unit to the N output line in accordance with a gain similarly determined by the capacitive division ratio.

When the S and N output lines have the same capacitance value Ch, the capacitive division ratio when outputting a signal from the readout unit also becomes equal between the S and N output lines. The gain of an optical signal output to the S output line, and the gain of a noise signal output to the N output line equally become A. In this case, the difference circuit connected to the S and N output lines outputs $$(\text{optical signal}) \times A - (\text{noise signal}) \times A = \{(\text{image signal}) + (\text{noise signal})\} \times A - \quad (8)$$
$$(\text{noise signal}) \times A$$
$$= (\text{image signal}) \times A$$

As represented by equation (8), no fixed pattern noise remains in a signal having undergone CDS processing.

The possibility of noise called shading noise left in a signal having undergone CDS processing will be described. The influence of the shading noise changes depending on the position of the output line.

In FIG. 1, output points R1 and K1 on the S output line that are connected to the first and third columns of the pixel array, and output points R2 and K2 on the N output line that are connected to the first and third columns of the pixel array will be examined. If optical signals output from the first and third columns of the pixel array have the same magnitude, the magnitudes of the output optical signals should be ideally equal to each other at the output points R1 and K1. If noise signals output from the first and third columns of the pixel array have the same magnitude, the magnitudes of the output noise signals should be ideally equal to each other at the output points R2 and K2.

In reality, however, the influence of disturbance noise or the like is different between the output points R1 and K1 spaced apart from each other on the S output line, and different shading noise components are superimposed on output optical signals. In addition, the influence of disturbance noise or the like is different between the output points R2 and K2 spaced apart from each other on the N output line, and different shading noise components are superimposed on output noise signals.

For example, let Vs be an optical signal supplied to the output point R1, and Vn be a noise signal supplied to the output point R2. Also, let Vs+Vo be an optical signal supplied to the output point K1, and Vn+Vo be a noise signal supplied to the output point K2. In other words, assume that the influence of disturbance noise or the like is different by Vo between the output points R1 and R2, and the influence of disturbance noise or the like is different by Vo between the output points K1 and K2. Let Ch be the capacitance value of the N output line, and Ch be that of the S output line. At this time, signals output to the S and N output lines are calculated as follows on the basis of the gain determined by the capacitive division ratio.

An optical signal output to the S output line at the output point R1 is $$(Ct \cdot Vs)/(Ct+Ch) \tag{9}$$

A noise signal output to the N output line at the output point R2 is $$(Ct \cdot Vn)/(Ct+Ch) \tag{10}$$

An optical signal output to the S output line at the output point K1 is $$Ct \cdot (Vs+Vo)/(Ct+Ch) \tag{11}$$

A noise signal output to the N output line at the output point K2 is $$Ct \cdot (Vn+Vo)/(Ct+Ch) \tag{12}$$

From equations (9) and (10), the signal of a pixel on the first column that is generated by performing CDS processing for signals output at the output points R1 and R2 is given by $$(Ct \cdot Vs)/(Ct+Ch) - (Ct \cdot Vn)/(Ct+Ch) = Ct \cdot (Vs-Vn)/(Ct+Ch) \tag{13}$$

From equations (11) and (12), the signal of a pixel on the third column that is generated by performing CDS processing for signals output at the output points K1 and K2 is given by $$Ct \cdot (Vs+Vo)/(Ct+Ch) - Ct \cdot (Vn+Vo)/(Ct+Ch) = Ct \cdot (Vs-Vn)/(Ct+Ch) \tag{14}$$

As represented by equations (13) and (14), no shading noise remains each in the signal of a pixel on the first column and the signal of a pixel on the third column.

As described above, the output line group 160 is interposed between the first dummy line 210 and the second dummy line 260. The first and second dummy lines 210 and 260 are set to the floating state during at least a period in which the readout unit outputs the first and second signals. This can make the coupling capacitances of all the output lines in the output line group 160 equal to each other. That is, this can reduce the difference in capacitance value between the plurality of output lines 220, 230, 240, and 250 which parallelly-transfer a plurality of signals from a plurality of pixels.

Since the difference in capacitance value between the plurality of output lines 220, 230, 240, and 250 is reduced, fixed pattern noise and shading noise left in a signal having undergone the CDS processing can be reduced on the subsequent stage. Since the first and second dummy lines 210 and 260 are set to the floating state, as described above, an error generated by the influence of a disturbance noise can be reduced.

It should be noted that a clamp circuit (not shown) and column amplifier (amplification unit: not shown) may also be further interposed between pixels on each column of the pixel array PA and the memory circuit 305 of the column. In this case, the clamp circuit outputs the difference signal of a pixel on each column, which is the difference between an optical signal and noise signal read out at different timings from a pixel on each column of the pixel array. The column amplifier is interposed between the memory circuit 305 and the clamp circuit. The column amplifier amplifies the difference signal of a pixel on each column that is obtained by the clamp circuit. The optical signal holding capacitance Cts holds the first signal read out from the pixel 110 on each column on a selected readout row. The noise signal holding capacitance Ctn holds the second signal read out from the pixel 110 on each column on a selected row. The first signal is obtained by superimposing the offset of the column amplifier on a difference signal. The second signal is the offset signal of the column amplifier. The second signal is output in synchronism with readout of a noise signal from a pixel, and thus can substantially be regarded to be output from the pixel.

Figure 5:
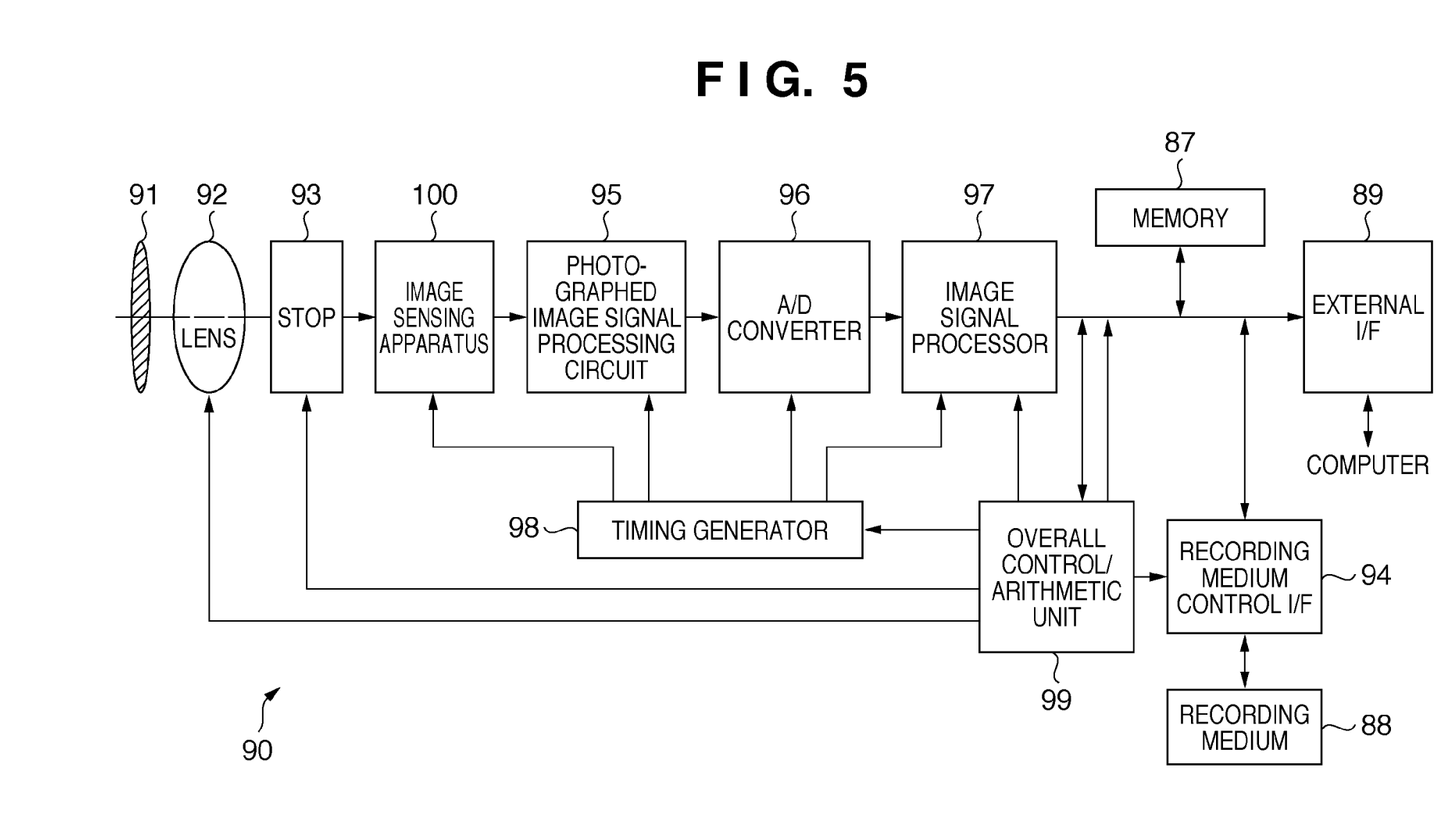
FIG. 5 is a block diagram of an imaging system to which the image sensing apparatus according to the first embodiment is applied.

FIG. 5 shows an example of an imaging system to which the image sensing apparatus according to the present invention is applied.

As shown in FIG. 5, an imaging system 90 mainly includes an optical system, the image sensing apparatus 100, and a signal processing unit. The optical system mainly includes a shutter 91, lens 92, and stop 93. The signal processing unit mainly includes a sensed signal processing circuit 95, A/D converter 96, image signal processor 97, memory 87, external I/F 89, timing generator 98, overall control/arithmetic unit 99, recording medium 88, and recording medium control I/F 94. The signal processing unit may not include the recording medium 88.

The shutter 91 is arranged in front of the lens 92 on the optical path to control the exposure.

The lens 92 refracts incident light to form an object image on the pixel array (image sensing plane) of the image sensing apparatus 100.

The stop 93 is interposed between the lens 92 and the image sensing apparatus 100 on the optical path. The stop 93 adjusts the quantity of light guided to the image sensing apparatus 100 after passing through the lens 92.

The image sensing apparatus 100 converts an object image formed on the pixel array into an image signal. The image sensing apparatus 100 reads out the image signal from the pixel array, and outputs it.

The sensed signal processing circuit 95 is connected to the image sensing apparatus 100, and processes an image signal output from the image sensing apparatus 100.

The A/D converter 96 is connected to the sensed signal processing circuit 95. The A/D converter 96 converts a processed image signal (analog signal) output from the sensed signal processing circuit 95 into a image signal (digital signal).

The image signal processor 97 is connected to the A/D converter 96. The image signal processor 97 performs various arithmetic processes such as correction for the image signal (digital signal) output from the A/D converter 96, generating image data. The image signal processor 97 supplies the image data to the memory 87, external I/F 89, overall control/arithmetic unit 99, recording medium control I/F 94, and the like.

The memory 87 is connected to the image signal processor 97, and stores image data output from the image signal processor 97.

The external I/F 89 is connected to the image signal processor 97. Image data output from the image signal processor 97 is transferred to an external device (e.g., a personal computer) via the external I/F 89.

The timing generator 98 is connected to the image sensing apparatus 100, sensed signal processing circuit 95, A/D converter 96, and image signal processor 97. The timing generator 98 supplies timing signals to the image sensing apparatus 100, sensed signal processing circuit 95, A/D converter 96, and image signal processor 97. The image sensing apparatus 100, sensed signal processing circuit 95, A/D converter 96, and image signal processor 97 operate in synchronism with the timing signals.

The overall control/arithmetic unit 99 is connected to the timing generator 98, image signal processor 97, and recording medium control I/F 94, and controls all of them.

The recording medium 88 is detachably connected to the recording medium control I/F 94. Image data output from the image signal processor 97 is recorded on the recording medium 88 via the recording medium control I/F 94.

With this arrangement, the image sensing apparatus 100 can provide a high-quality image (image data) as long as it can obtain a high-quality image signal.

Figure 6:
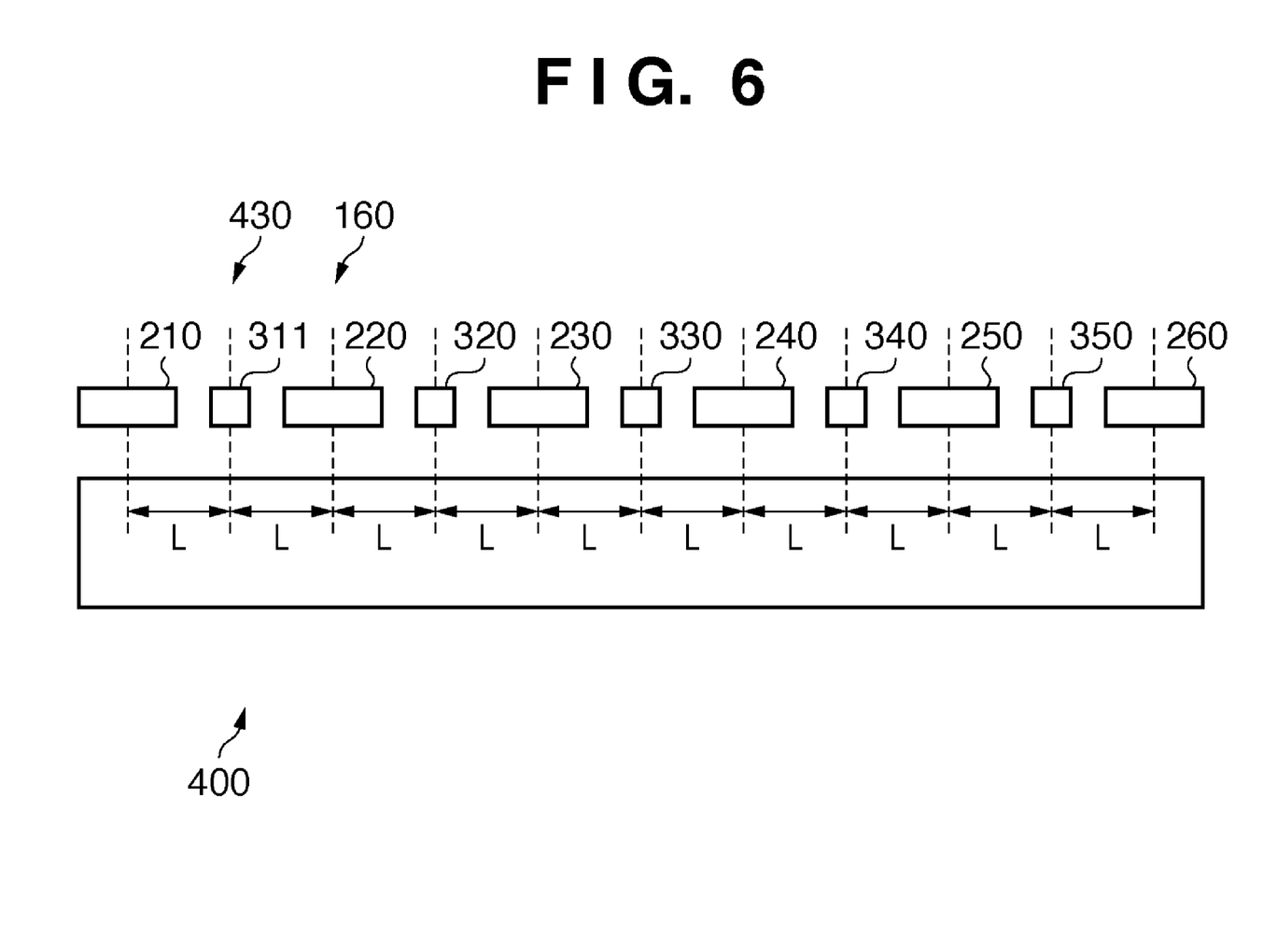
FIG. 6 is a sectional view of a structure corresponding to the arrangement of FIG. 1 taken along the line A-A in an image sensing apparatus 400 according to the second embodiment of the present invention.

An image sensing apparatus 400 according to the second embodiment of the present invention will be explained. A difference from the first embodiment will be mainly explained. FIG. 6 is a sectional view of a structure corresponding to the arrangement of FIG. 1 taken along the line A-A in the image sensing apparatus 400 according to the second embodiment of the present invention.

The image sensing apparatus 400 includes an output unit 430. The output unit 430 includes a plurality of shielding lines 311, 320, 330, 340, and 350.

The plurality of shielding lines 311, 320, 330, 340, and 350 electrically shield a first dummy line 210, first S output line 220, first N output line 230, second N output line 240, second S output line 250, and second dummy line 260 from each other. In this case, the dummy line 210, first S output line 220, first N output line 230, second N output line 240, second S output line 250, and second dummy line 260 are capacitively coupled to each other by bypassing the shielding lines. That is, the coupling capacitance values of the first S output line 220, first N output line 230, second N output line 240, and second S output line 250 become smaller than those when no shielding line is laid out. As a result, the difference in capacitance value between a plurality of output lines in the output line group 160 can be further reduced.

Figure 7:
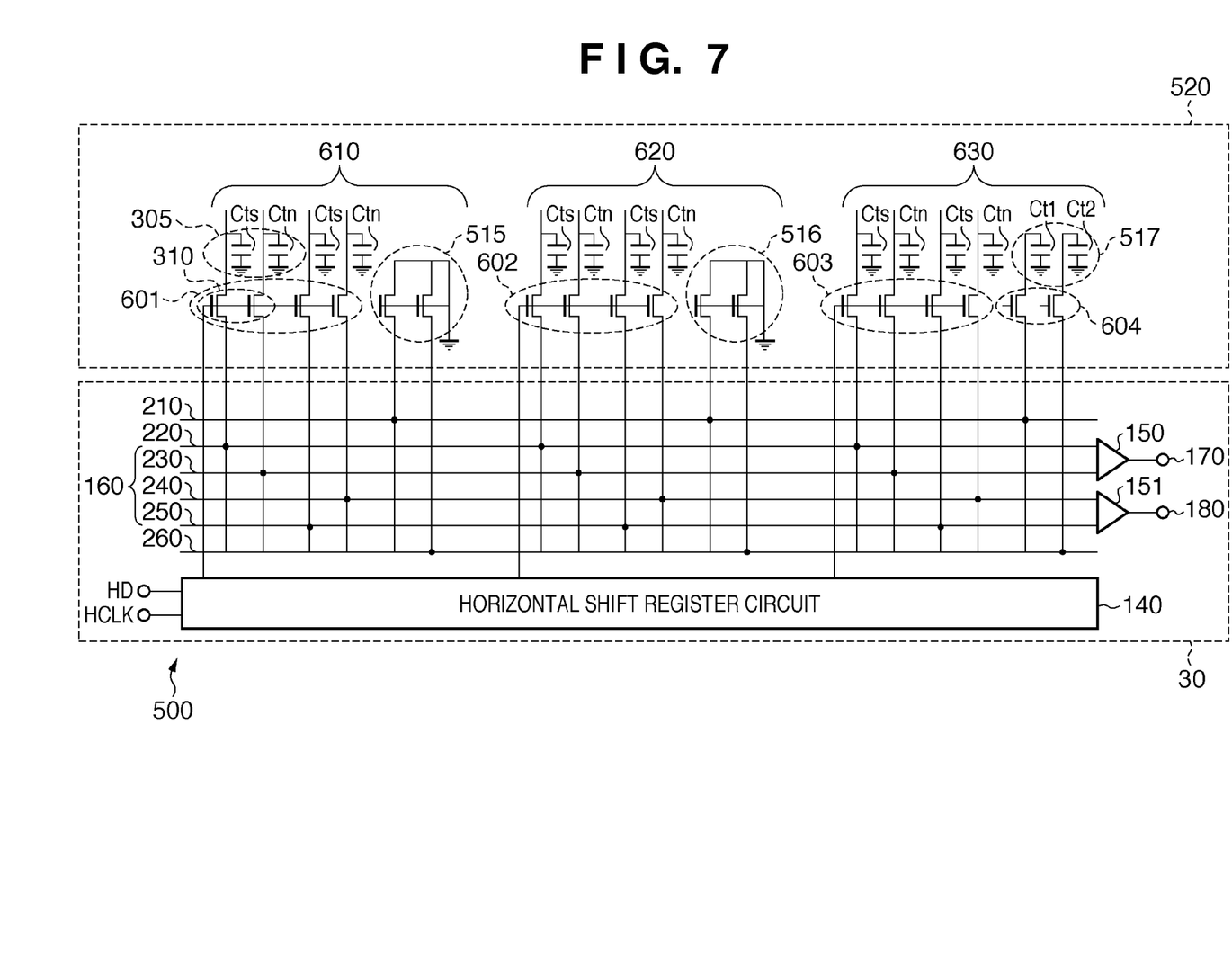
FIG. 7 is a circuit diagram showing a readout unit 520 in an image sensing apparatus 500 according to the third embodiment of the present invention.

An image sensing apparatus 500 according to the third embodiment of the present invention will be explained. A difference from the first embodiment will be mainly explained. FIG. 7 is a circuit diagram showing a readout unit 520 in the image sensing apparatus 500 according to the third embodiment of the present invention.

The readout unit 520 includes dummy transfer circuits 515, 516, and 604, and a dummy line memory circuit 517.

The dummy transfer circuits 515 and 516 have the similar arrangement as that of a transfer circuit 310, and are always held OFF. The dummy transfer circuit 604 has the similar arrangement as that of the transfer circuit 310, and is turned on at a predetermined timing. When turned on, the dummy transfer circuit 604 electrically connects the dummy line memory circuit 517 to a first dummy line 210 or second dummy line 260.

The dummy line memory circuit 517 has the similar arrangement as that of a memory circuit 305. More specifically, the dummy line memory circuit 517 includes first and second dummy holding capacitances Ct1 and Ct2 each having a capacitance value Ct. When the left side transistor of the dummy transfer circuit 604 is turned on, the first dummy holding capacitance Ct1 is connected to the first dummy line 210. When the right side transistor of the dummy transfer circuit 604 is turned on, the second dummy holding capacitance Ct2 is connected to the second dummy line 260.

Figure 8:
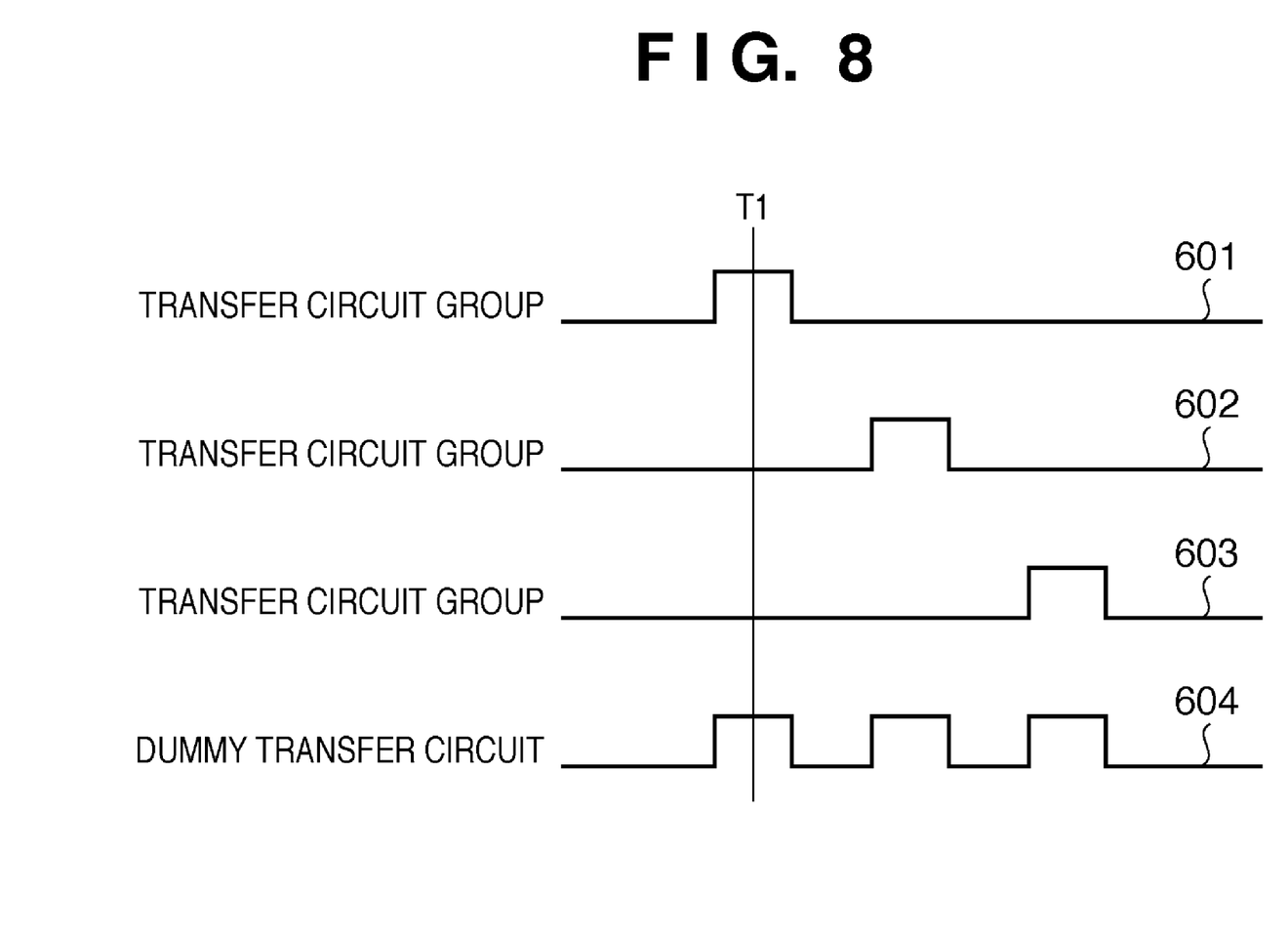
FIG. 8 is a timing chart showing the operation of the readout unit 520.

In the readout unit 520, a signal is transferred to the output line from each of units 610, 620, and 630 (units each of two columns of a pixel array PA) in turn. The operation of the readout unit 520 will be explained with reference to FIG. 8 mainly for transfer circuit groups 601, 602, and 603 each including two transfer circuits 310. FIG. 8 is a timing chart showing the operation of the readout unit 520.

As shown in FIG. 8, the transfer circuit groups 601, 602, and 603 are sequentially turned on. When each of the transfer circuit groups 601, 602, and 603 is turned on, the dummy transfer circuit 604 is turned on. Hence, the two OFF-state dummy transfer circuits 515 and 516 and one ON-state dummy transfer circuit 604 are connected to the first and second dummy lines 210 and 260 regardless of which of the transfer circuit groups 601, 602, and 603 is turned on. The first and second dummy holding capacitances Ct1 and Ct2 are connected to the first and second dummy lines 210 and 260 via the ON-state dummy transfer circuit 604, respectively.

When outputting signals from the readout unit 520 to an output line group 160, the two OFF-state transfer circuits 310 and one ON-state transfer circuit 310 are connected to the respective output lines of the output line group 160. Further, either an optical signal holding capacitance Cts or noise signal holding capacitance Ctn is connected to each output line of the output line group 160 via the ON-state transfer circuit 310. The above-described arrangement and operation can make the influence of the dummy transfer circuit and dummy line memory circuit on the dummy line equal to that of the transfer circuit and line memory circuit on the output line.

For example, a case where each of the transfer circuit and dummy transfer circuit uses two NMOS transistors will be examined. In the dummy transfer circuits 515 and 516, the drain and gate of each NMOS transistor are connected to GND level, that is, the NMOS transistor does not function as a switch. The junction capacitance between the gate and source of the NMOS transistor is parasitic on the dummy line. It is also possible to connect the drain to the power supply level and the gate to GND level, instead of connecting the drain and gate of the NMOS transistor to GND level. As long as the junction capacitances of the transfer circuit and dummy transfer circuit are parasitic on the dummy lines, the transfer circuit and dummy transfer circuit may also be formed from elements other than NMOS transistors.

For example, at timing T1 in FIG. 8, each transfer circuit 310 of the transfer circuit group 601 and the dummy transfer circuit 604 are turned on. In this case, the junction capacitances of the transfer circuits 310 of the OFF-state transfer circuit groups 602 and 603 are parasitic on the respective output lines of the output line group 160, in addition to the holding capacitance Ct. The junction capacitances of the OFF-state dummy transfer circuits 515 and 516 are parasitic on the dummy line, in addition to the capacitance value Ct. Thus, a junction capacitance parasitic on the dummy line and a junction capacitance parasitic on the output line become equal to each other.

As described above, the influence of the dummy transfer circuit and dummy line memory circuit on the dummy line can be made equal to that of the transfer circuit and line memory circuit on the output line. The coupling capacitance between output lines and that between output and dummy lines can be easily made equal to each other. As a result, the difference in capacitance value between the output lines of the output line group 160 can be further reduced.

Figure 9:
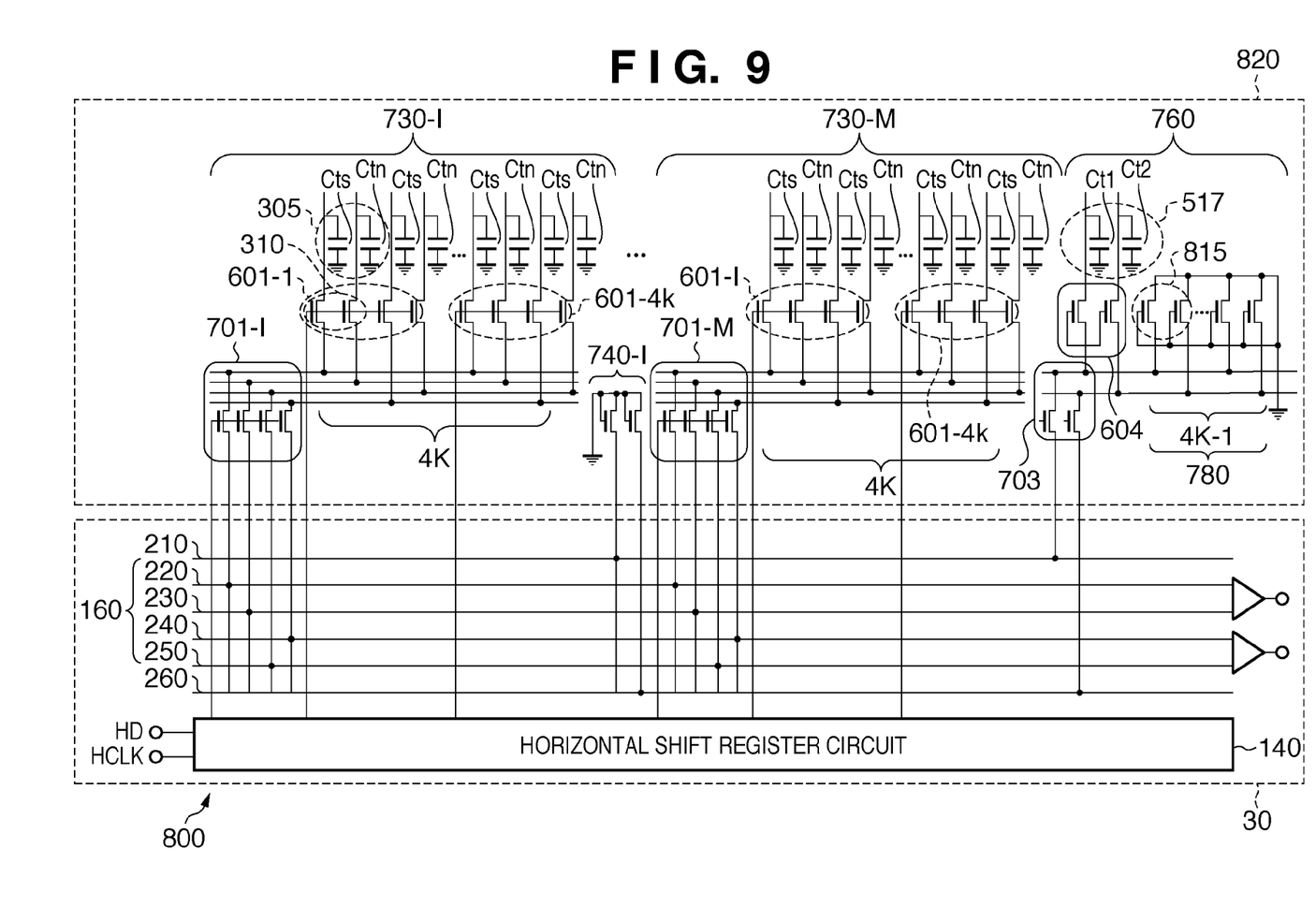
FIG. 9 is a circuit diagram showing a readout unit 820 in an image sensing apparatus 800 according to the fourth embodiment of the present invention.

An image sensing apparatus 800 according to the fourth embodiment of the present invention will be explained. A difference from the third embodiment will be mainly explained. FIG. 9 is a circuit diagram showing a readout unit 820 in the image sensing apparatus 800 according to the fourth embodiment of the present invention.

The readout unit 820 further includes block selection switches 701-1 to 701-M, dummy block selection switches 703 and 740-1 to 740-(M−1), a dummy transfer circuit 604, a dummy transfer circuit group 780, and a dummy line memory circuit 517. In this case, M is a natural number of 2 or more. In FIG. 9, the dummy block selection switch 740-(M−1) is not illustrated.

The block selection switches 701-1 to 701-M correspond to M blocks 730-1 to 730-M each including a plurality of memory circuits 305 and a plurality of transfer circuits 310. Each of the blocks 730-1 to 730-M includes 4k transfer circuit groups 601-1 to 601-4k identical to the transfer circuit group 601 in the third embodiment.

The dummy block selection switch 703 corresponds to a dummy block 760. The dummy block 760 basically has the similar arrangement as the blocks 730-1 to 730-M. More specifically, the dummy block 760 includes the dummy transfer circuit group 780, dummy transfer circuit 604, and dummy line memory circuit 517. The dummy transfer circuit group 780 includes (4k−1) dummy transfer circuits 815. Each dummy transfer circuit 815 is always held OFF.

The dummy block selection switches 740-1 to 740-(M−1) are identical to the dummy transfer circuits 515 and 516 in the third embodiment.

Figure 10:
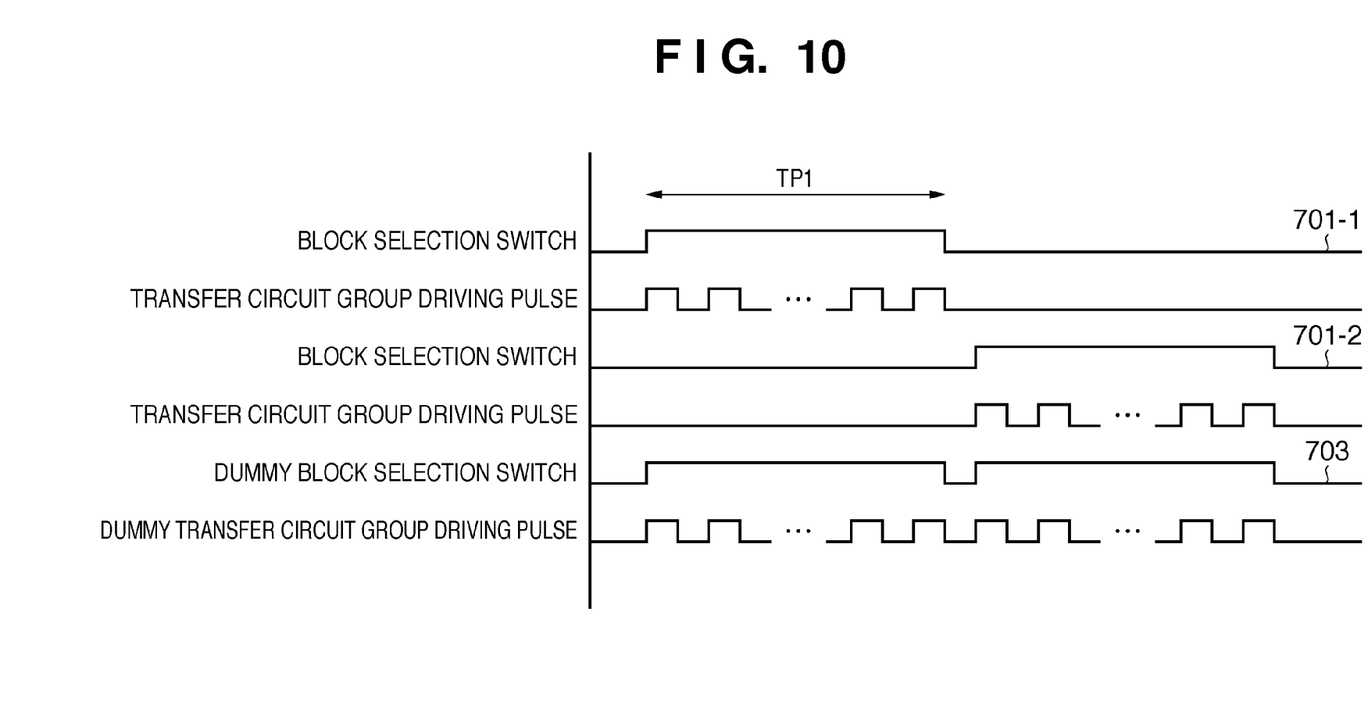
FIG. 10 is a timing chart showing the operation of the readout unit 820.

In the readout unit 820, a signal is transferred to the output line for each of the blocks 730-1 to 730-M. The operation of the readout unit 820 will be explained with reference to FIG. 10 mainly for the block selection switches 701-1 to 701-M. FIG. 10 is a timing chart showing the operation of the readout unit 820.

The block selection switches 701-1 to 701-M are sequentially turned on to select the corresponding blocks 730-1 to 730-M. In each of the selected blocks 730-1 to 730-M, the transfer circuit groups 601-1 to 601-4k are sequentially turned on to transfer signals from corresponding units (units each of two columns of a pixel array PA) to output lines. This can reduce the parasitic capacitance generated on the output line by the transfer circuit.

The dummy block selection switch 703 is turned on regardless of which of the block selection switches 701-1 to 701-M is turned on. Every time one of the block selection switches 701-1 to 701-M is turned on, (M−1) OFF-state dummy block selection switches and one ON-state dummy block selection switch 703 are connected to first and second dummy lines 210 and 260. Then, the first and second holding capacitances Ct1 and Ct2 are connected to the first and second dummy lines 210 and 260 via the ON-state dummy block selection switch 703 and the dummy transfer circuit 604, respectively. Also, (4k−1) OFF-state dummy transfer circuits 815 are connected to the first and second dummy lines 210 and 260 via the ON-state dummy block selection switch 703.

When outputting signals from the readout unit 820 to an output line group 160, the (M−1) OFF-state block selection switches and one ON-state block selection switch are connected to the respective output lines of the output line group 160. Further, either the optical signal holding capacitance Cts or noise signal holding capacitance Ctn is connected to the respective output lines of the output line group 160 via the ON-state block selection switch and ON-state transfer circuit group. The (4k−1) OFF-state transfer circuit groups are connected to the respective output lines of the output line group 160 via the ON-state block selection switch. The above-described arrangement and operation can make the influence of the dummy block on the dummy line equal to that of a selected block on the output line.

For example, a case where each of the transfer circuit and dummy transfer circuit uses two NMOS transistors will be examined. In signal transfer period TP1, either the optical signal holding capacitances Cts or noise signal holding capacitances Ctn are connected to the respective output lines of the output line group 160 via the ON-state block selection switch 701-1 and ON-state transfer circuit groups 601-1 to 601-4k. The junction capacitances of the OFF-state transfer circuit groups 601-1 to 601-4k are parasitic on the respective output lines of the output line group 160 via the ON-state block selection switch 701-1. In contrast, the first or second dummy holding capacitance Ct1 or Ct2 is connected to each dummy line via the ON-state dummy block selection switch 703 and ON-state transfer circuit 604. The parasitic capacitances of the (4k−1) OFF-state dummy transfer circuits 815 are parasitic on each dummy line via the ON-state dummy block selection switch 703. This makes a junction capacitance parasitic on the dummy line almost equal to that on the output line.

As described above, the influence of the dummy block on the dummy line can be made equal to that of a selected block on the output line. The coupling capacitance between output lines and that between output and dummy lines can be easily made equal to each other. Hence, the difference in capacitance value between the output lines of the output line group 160 can be further reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-033624, filed Feb. 14, 2008 which is hereby incorporated by reference herein in its entirety.

What is claimed is:

1. An image sensing apparatus comprising:
   a pixel array in which a plurality of pixels are arrayed two-dimensionally;
   a selection unit which selects a readout row from which a signal is to be read out in the pixel array;
   a readout unit which reads out a signal from the readout row selected by the selection unit, and outputs a plurality of signals of each column on the readout row; and
   an output unit,
   wherein the output unit includes
   an output line group including a plurality of pairs, each of the pairs including a first output line which transfers a first signal output from the readout unit and a second output line which transfers a second signal output from the readout unit,
   a plurality of difference circuits which are arranged in correspondence with the plurality of pairs, each of the plurality of difference circuits generating a difference signal between the first signal and the second signal in the corresponding pair, a first dummy line where an electric potential is set to a floating state during at least a period in which the readout unit outputs the first signal and the second signal, and
a second dummy line where an electric potential is set to a floating state during at least a period in which the readout unit outputs the first signal and the second signal,
and wherein the output line group is interposed between the first dummy line and the second dummy line,
the readout unit includes a plurality of memory circuits which hold signals of a plurality of columns on the readout row,
adjacent memory circuits among the plurality of memory circuits are connected to different pairs,
each of the plurality of memory circuits includes
a first holding capacitance which holds the first signal from the pixel, and
a second holding capacitance which holds the second signal from the pixel,
a gain determined by a ratio of a capacitance value of the first holding capacitance and a capacitance value of the first output line is applied to the first signal output to the first output line, and
a gain determined by a ratio of a capacitance value of the second holding capacitance and a capacitance value of the second output line is applied to the second signal output to the second output line.

2. The apparatus according to claim 1, wherein
the output unit further includes a control unit which controls each electric potential of the first dummy line and the second dummy line to a floating state during a period in which the readout unit outputs the first signal and the second signal.

3. The apparatus according to claim 2, wherein
the control unit resets, after the plurality of difference circuits output image signals, electric potentials of the first dummy line and the second dummy line to a reset electric potential.

4. The apparatus according to claim 1, wherein
each of the first dummy line and the second dummy line is connected to a dummy holding capacitance.

5. The apparatus according to claim 1, wherein
each of the first dummy line and the second dummy line elongates to the difference circuits.

6. The apparatus according to claim 1, wherein
the first signal includes an optical signal which is obtained by superimposing a noise signal on an image signal, and
the second signal includes the noise signal.

7. The apparatus according to claim 1, wherein
the readout unit includes a plurality of amplification units, each amplifying a difference signal between two signals read out at different timings from a pixel on each column of the pixel array,
the first signal includes a signal which is obtained by superimposing an offset of one of the amplification units on the amplified difference signal, and
the second signal includes a signal of the offset of the one amplification unit.

8. An imaging system comprising:
an image sensing apparatus according to claim 1;
an optical system which forms an image on an image sensing plane of the image sensing apparatus; and
a signal processing unit which processes a signal output from the image sensing apparatus to generate image data.

* * * * *